Patented Mar. 27, 1923.

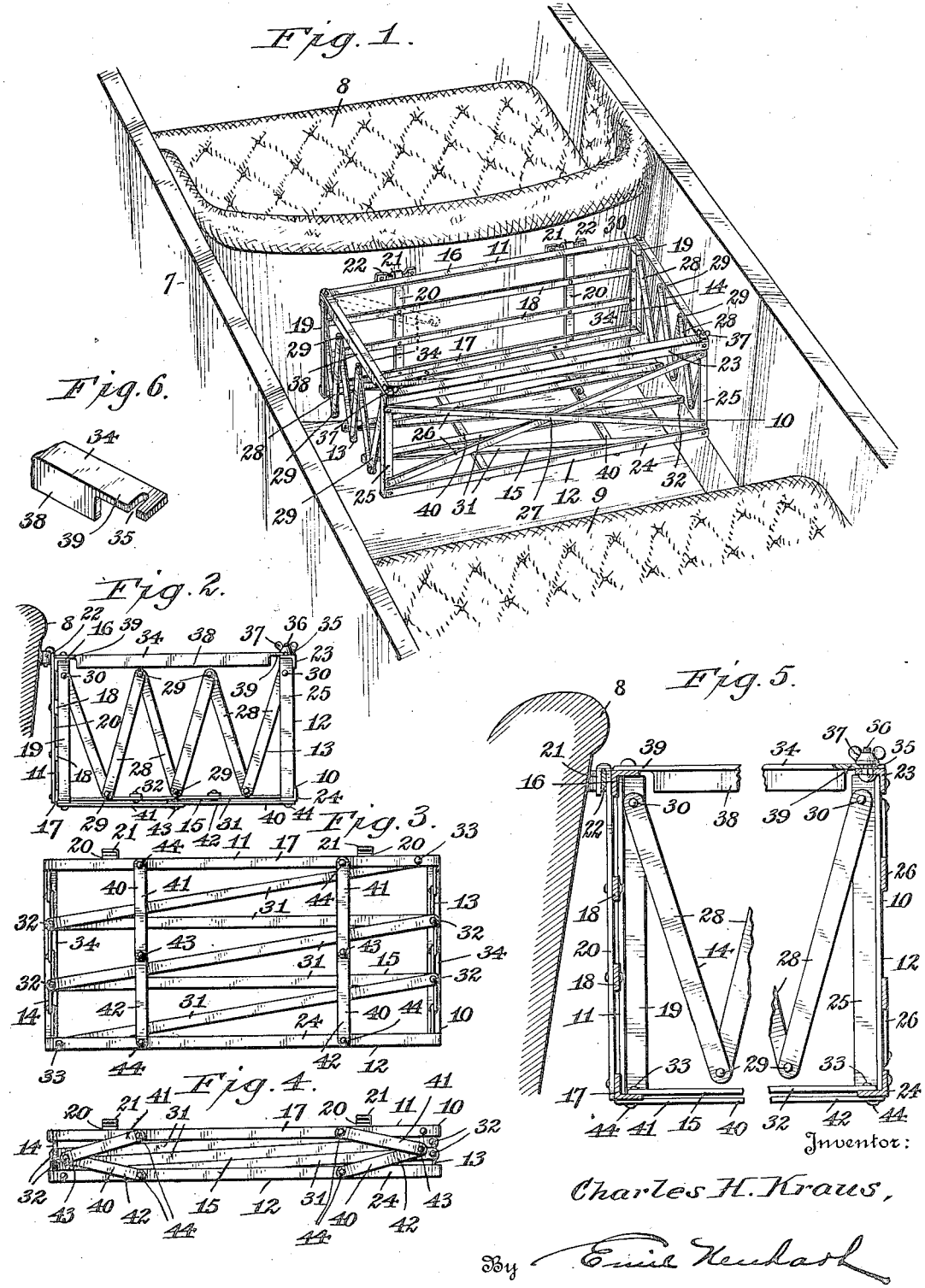

1,449,419

UNITED STATES PATENT OFFICE.

CHARLES H. KRAUS, OF BUFFALO, NEW YORK.

INFANT'S BED FOR AUTOMOBILES.

Application filed May 6, 1921. Serial No. 467,259.

*To all whom it may concern:*

Be it known that I, CHARLES H. KRAUS, a citizen of the United States, residing at Buffalo, in the county of Erie and State of New York, have invented certain new and useful Improvements in Infants' Beds for Automobiles, of which the following is a specification.

My invention relates to improvements in infants' beds for automobiles.

The primary object of the invention is to provide a light and inexpensive bed of this kind which can be easily collapsed while attached to the rear of the front seat of an automobile, or be extended to serve as a bed for an infant, the position of the bed being such that the infant lying therein will be protected from drafts.

A further object of my invention is to provide novel means for securing the bed to the rear of an automobile seat, and to provide novel means for keeping the bed extended.

A still further object is to provide a bed of this type formed entirely of bar material, the bars forming opposite sides being riveted while the bars forming the bottom and ends of the bed are pivotally connected to permit of collapsing the bed.

A further object of my invention is the production of a device of this kind, which while particularly designed as a bed, may be utilized for carrying various articles when extended.

With the above and other objects in view, the invention consists of the novel features of construction and in the arrangement and combination of parts to be hereinafter described and more particularly pointed out in the subjoined claims.

In the drawings:—

Fig. 1 is a perspective view of a portion of an automobile showing my improved bed in extended position and attached to the rear of the front seat.

Fig. 2 is an end view of the device extended, showing the manner of supporting the same from the automobile seat.

Fig. 3 is a bottom plan view of the device extended.

Fig. 4 is a bottom plan view of the device collapsed or folded.

Fig. 5 is a broken transverse section of the device extended, on an enlarged scale.

Fig. 6 is a perspective view of a portion of one of the end brace bars.

7 designates the automobile having a front seat 8 and a rear seat 9 and attached to the rear of the front seat is my improved foldable or collapsible bed 10, considered as a whole.

The bed comprises two side members 11, 12, two end members 13, 14, and a bottom 15. The side member 11 is adapted to be placed against or in close proximity to the rear of the front seat 8, and it comprises an upper longitudinal angle bar 16, a lower longitudinal angle bar 17, and intermediate longitudinal flat bars 18, the ends of the bars 16, 17 and 18 being secured to upright corner bars 19 of angular formation.

Arranged outside of the bars 16, 17 and 18 and secured thereto are hanger bars 20. These bars are arranged between the angular corner bars 19 and have their upper ends rebent to form hooks 21 adapted to engage flat loops 22 secured to the rear of the front automobile seat 8. The side member 12 comprises an upper angle bar 23, a lower angle bar 24, corner angle bars 25 riveted or otherwise secured to the upper and lower angle bars 23, 24, and two diagonally-disposed bars 26, which extend from the upper corner at one end of the side 12 to the lower corner at the other end thereof, thus crossing each other at the center, as at 27, the ends of the flat diagonal bars being riveted to the corner angle bars 25.

Each end member comprises a plurality of flat bars 28 pivotally connected together at their ends, as at 29, the end or outer bars 28 having their free extremities pivotally secured to the corner angle bars 19 and 25, respectively, as at 30.

The bottom 15 comprises a plurality of flat bars 31 pivotally connected together at their ends, as at 32, with the free extremities of the outer or end bars pivotally connected to the horizontal webs of the lower angle bars 17 and 24, respectively, as at 33, the flat bars 31 being so arranged that the free end of one of said end or outer bars is pivotally connected to the lower angle bars 17 at one end of the bed while the free extremity of the other end or outer bar is pivotally connected to the lower angle bar 24 at the other end of the bed.

The pivotally connected bars 28 forming the end members of the bed and the pivotally connected bars 31 forming the bottom of the bed are of zigzag formation when the bed is extended, as clearly shown in Figs.

2 and 3, and to retain the bars in such condition I pivotally secure to the ends of the upper angle bars 16 one end of each of two retainer angle bars 34, the other ends of said bars being provided with notches 35, which receive bolts 36 extending upwardly through the ends of the upper angle bar 23, said bolts having thumb nuts 37 adapted to bear against the upper side of the retainer angle bars 34 at their free ends. It will be noticed that the vertical or depending webs 38 of said angle bars are cut away at the ends of said bars to provide flat portions 39, thereby providing clearance for the retainer angle bars to swing on their pivots without coming in contact with the upper angle bars 16 and 23. By applying retainer bars, such as 34, to the ends of the bed, one at the upper edge of each of said ends, and so arranging said bars that they swing horizontally, the ends of the bed may be folded or collapsed while the bedding is retained within the bed, as there are no parts forming the ends of the bed which would necessitate the removal of the bedding or interfere with the bedding if retained within the bed when folding the latter. It is apparent that the bed could not be folded or collapsed to its full extent if bedding were retained therein; nevertheless, considerable space could be saved by partly folding the bed and at the same time the bedding could be stored where it would at all times be handy and would not discommode the occupants of an automobile, in connection with which this bed is particularly adapted.

To the lower angle bars 17 and 24, jointed retainer bars 40 are provided, each jointed retainer bar comprising two sections 41, 42 pivotally connected together, as at 43, the outer ends of both sections being pivotally secured to the under side of the lower angle bars 17 and 24, as at 44. These retainer bars serve to support the flat bars 31 forming the bottom of the bed.

It is of course to be understood that suitable bedding is placed upon the bottom 15 of the bed. When it is desired to collapse or fold the bed the jointed retainer bars 40 are broken so as to swing off the dead center, without disconnecting the outer ends of two sections thereof from the lower angle bars 17 and 24. Said retainer bars are therefore always in a position ready for manipulation without resorting to manipulation of fastening means, thus permitting the bottom to fold, provided the retainer angle bars 34 are disconnected from the upper angle bar 23, and to permit of this, the thumb nuts 37 are loosened, which permits the retainer angle bars 34 to be swung inwardly so that the flat end portions 39 thereof lie against the top of the upper angle bar 16.

With the retainer angle bars 34 swung inwardly and the jointed retainer bars 40 broken, the side 10, which may be referred to as the outer side, may be moved forwardly or toward the side 11, and during such action the flat bars 28 forming the end members and the flat bars 31 forming the bottom close upon themselves so as to have the adjacent edges of adjoining bars in contact with each other.

From Fig. 4 it will be clear that the outer side 10 will be somewhat spaced from the side 11 of the bed, when the latter is collapsed, as clearly shown in Fig. 4, and the bedding can be arranged vertically between the two sides. When the bed is collapsed, comparatively little space is required for the same.

Having thus described my invention, what I claim is:—

1. A folding bed comprising rigid sides having angle bars at their upper and lower ends, and flat bars intermediate said angle bars, one of said sides having vertical bars secured thereto provided with hooks at their upper ends by means of which the bed is to be supported, folding ends connecting the ends of said sides, a folding bottom, and combined supports and retainers on which said bottom rests.

2. A folding bed comprising rigid sides, folding ends, a folding bottom, retainer means connecting opposite ends of said sides at the top thereof and adapted to swing over one of said sides when folding the bed, and folding retainer means connecting the bottom of said sides at points intermediate their ends.

3. A folding bed comprising rigid sides having top, bottom and end angle bars, and flat bars disposed between said top and bottom angle bars and having their ends secured to said end bars, folding ends comprising flat bars having their ends pivotally connected together and arranged in zig-zag form with the free ends of the outer flat bars pivotally connected to said end angle bars, a folding bottom comprising flat bars pivotally connected together and having the free ends of the outer bars thereof pivotally connected to the bottom angle bars of said rigid sides, retainer bars connecting corresponding ends of the top angle bars of said sides, and folding retainer bars connecting the bottom angle bars of said sides and supporting said bottom.

4. An infant's bed comprising rigid sides having end angle bars, a plurality of pivotally connected bars having the free ends of the outer bars thereof pivotally connected to corresponding end angle bars of said sides, a folding bottom connected to said sides, retainer means pivotally connected to at least one of said sides to hold said sides in spaced relation, and a retainer bar above said pivotally connected bars at each end of the bed, adapted to swing over one of said sides when folding the bed.

5. An infant's folding bed comprising two rigid sides, means connecting the lower ends of said sides for retaining them in spaced relation, retainer bars pivotally secured to the upper end of one of said sides and having notches at their free ends, bolts rising from the upper end of the other side and adapted to extend through said notches, thumb nuts applied to said bolts, foldable ends connecting opposite sides, and a foldable bottom also connecting opposite sides and supported by the retaining means connecting the lower ends of said sides.

6. An infant's bed comprising rigid sides, folding ends, a folding bottom, jointed retainer bars connecting said sides at their lower ends and supporting said folding bottom, and a retainer angle bar at each end pivotally connected to one of the ends of one side and having a notch at its other end, bolts rising from the other side at its ends and entered in said notches, and thumb nuts secured to said bolts and adapted to firmly clamp said retainer angle bars in place.

7. An infant's bed comprising sides formed of longitudinally-disposed bars, end angle bars to which said longitudinally-disposed bars are secured, and crossed diagonal bars between said longitudinal bars and a single series of pivotally connected bars arranged in zig-zag form at each end of said bed, the free ends of the outermost bars of each series being pivotally secured to the end angle bars of said sides near their upper ends.

8. An infant's bed comprising rigid sides having inwardly-extending flanges at their lower ends, foldable ends connecting the ends of said sides, and a foldable bottom formed of longitudinally-disposed bars arranged in zig-zag form and having the free ends of the outer bars thereof pivotally connected to said inwardly-directed flanges of said sides, the free end of one outer bar being pivotally connected at one end of one side and the free end of the other outer bar of said bottom being pivotally connected to the opposite end of the other side.

9. An infant's folding bed comprising rigid sides, folding ends, a folding bottom, and a horizontally swinging retainer angle bar at each end pivotally connected to one of the ends of one side and arranged to swing over said side when folding the bed, and means to secure the other end to the corresponding end of the other side.

10. An infant's folding bed comprising rigid sides, a folding bottom, and folding ends, each end comprising a series of pivotally connected bars reaching from side to side, and a single horizontally swinging retainer bar at each end of the bed connected to one side and adapted to swing onto said side when folding the bed, said retainer bars being detachably connected to the other side of the bed.

In testimony whereof I affix my signature.

CHARLES H. KRAUS.